March 18, 1969 R. P. MATTSON 3,433,216
SELF-EVACUATING FLUID SAMPLING DEVICE
Filed Dec. 22, 1966
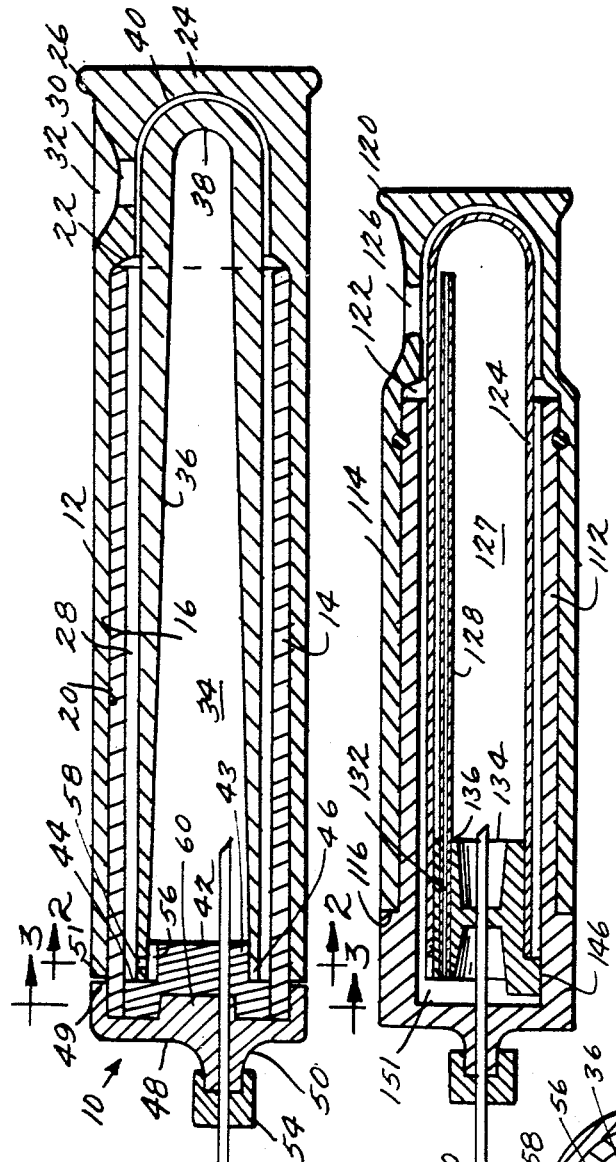
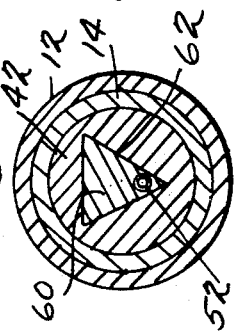
INVENTOR.
ROGER P. MATTSON
BY
Cushman, Darby & Cushman
ATTORNEYS.

United States Patent Office 3,433,216
Patented Mar. 18, 1969

3,433,216
SELF-EVACUATING FLUID SAMPLING DEVICE
Roger P. Mattson, Casper Clinic, 940 E. 3rd St., Suite 105, Casper, Wyo. 82601
Filed Dec. 22, 1966, Ser. No. 603,986
U.S. Cl. 128—2       15 Claims
Int. Cl. A61m 1/00

This invention relates generally to medical instruments which are used to withdraw fluids such as blood from the human body.

Briefly, the invention provides a vessel to receive and store the fluid and a hollow needle to transfer the fluid from the body to the vessel. The invention also provides means for use with the vessel and needle when fluids are being withdrawn to provide suction in the vessel and through the needle.

It is well known to withdraw blood from a patient's veins with a conventional hypodermic syringe and needle. The blood specimen then is transferred to a small vessel for testing or for temporary storage until taken to a laboratory for carrying out various tests. An improvement over this system is disclosed by Kleiner in U.S. Patent 2,460,640. As described in that patent, a vessel is used to receive the blood which as supplied is in sterile condition and with its interior evacuated. The vessel may, for example, be evacuated by the manufacturer and sealed before sold. Implements are provided to pierce the seal with the needle so that the vacuum will withdraw the fluid from the body. This has advantages over the use of a syringe. In the first place, there is no need to transfer from a syringe to a second vessel. Secondly, pre-evacuation of the vessel speeds the withdrawal of fluid, to minimize the patient's discomfort. After use, the vessel will be discarded.

However, this arrangement also has certain disadvantages. Generally most hospitals or laboratories are reluctant, in view of the economics involved, to dispose of the receptacle once it is used even though it is specifically made to be disposable. In retaining these disposable fluid receptacles they may accumulate a large number which at the present time are merely used as secondary receptacles for other clinical analysis. In principle, the vessels could be sterilized, evacuated and sealed for reuse, but this requires equipment not ordinarily available. Furthermore, this type of equipment depends on rapid use after the seal has been broken to avoid premature loss of vacuum.

It is the primary object of the present invention to overcome these shortcomings by providing a reusable needle-receptacle unit which can be evacuated during or immediately prior to use, in a manner similar to the operation of a conventional hypodermic syringe.

It is a further object of the invention to furnish a structure for evacuating a reusable needle-receptacle unit and maintaining said vacuum until insertion into the patient which allows the instantaneous withdrawal of fluid.

Another and still further object of the invention contemplates an instrument which includes a holder in which the fluid receptacle is placed, thereby efficiently cooperating with the fluid receiving receptacle as well as the tissue piercing needle.

With these and other objects in mind, reference is had to the attached sheet of drawings illustrating the practical embodiments of the invention and in which:

FIGURE 1 is a structural cross-sectional view of the instrument taken along the horizontal center line thereof showing the complete structure of the instrument;

FIGURE 2 is a lateral cross-sectional view of the instrument taken along the line 2—2 of FIGURE 1;

FIGURE 3 is a cross-sectional view of the instrument taken along the line 3—3 of FIGURE 1;

FIGURE 4 is a cross-sectional view of another embodiment of the instrument taken along the horizontal center line thereof disclosing particularly all the elements of the instrument;

FIGURE 5 is an amplified cross-sectional view of a portion of the apparatus of FIGURE 4 illustrating the sealing means and concomitant evacuation means for the receptacle; and FIGURE 6 is a cross-sectional view taken from line 6—6 of FIGURE 5.

Referring now to the drawings and particularly to FIGURES 1, 2 and 3 inclusive, numeral 10 indicates the structural assembly of the fluid withdrawal and storing instrument which includes a receptacle 36 and means for evacuating and filling it with a body fluid.

The evacuating means is generally composed of two longitudinally disposed, preferably cylindrical housings, 12 and 14, the outer housing 12 slidably receiving the inner housing 14. The inner housing 14 is a tube having both ends open and is generally disposed with its outer lateral walls 16 in an operable engaging relationship, which is slidably movable but substantially air tight, with the inner sidewall 20 of the outer housing 12. The outer housing 12 is closed at one end and its inner sidewall 20 has a peripheral shoulder abutment 22 near its closed end 24, to limit the movement of the inner housing 14. The closed end 24 of the outer housing has a transverse laterally and peripherally extending bead 26 around its rim. This bead 26 helps the attending physician or nurse to grasp the outer housing 12 between fingers similarly to the piston of a hypodermic syringe. Near the bead 26 the outer housing 12 also has a hole 30 through its wall within a concomitant thumb recess or depression 32. This structure permits the operator to create a vacuum within the receptacle 36, when pulling the outer housing 12, as will be explained more fully hereinafter.

The inner housing 14 and the outer housing 12 define a cylindrical chamber 28 in which there is located the fluid receiving receptacle 36. This receptacle is in the general configuration of a test tube, with a cylindrical elongated shape, open at one end and closed at the other, at a curved bottom surface 38, and can be made of either glass, plastic or any other material which can be readily sterilized. As seen in FIGURE 1, the inner terminal surface 40 of the closed end 24 of the outer housing is shaped to receive the closed end 38 of the receptacle, so that there is a minimum of space in cylindrical chamber 28 not occupied by the receptacle. Surfaces 38 and 40 are adjacent but do not contact one another.

At the open end of the fluid receptacle 36, there is a plug 42, generally of circular configuration. The plug and the open end of the receptacle are constructed to permit a substantially hermetic seal and also to permit a temporary opening into the receptacle when it is being evacuated. The plug 42 has an overlapping peripheral shoulder 44 midpoint along its lateral surface, which overlaps the rim 46 of the receptacle 36. Consequently, the plug 42 extends longitudinally into and is received by the chamber 34 of the receptacle 36, up to the limiting position established by the overlapping shoulder 44. The outer end of the plug 42, is concave and receives a portion of a cap 48 which may be composed of the same material as the outer and inner housings 12 and 14 respectively.

The particular closure relationship of the plug 42 with the receptacle 36 is best seen in FIGURE 2. The inner and outer housings 12 and 14 are shown in the sliding relationship which assures that the vacuum within chamber 34 can be created and maintained. The receptacle 36 receives the plug 42 so that the lower section 43 of the plug 42 is in a snug but movable relationship with the inner wall of receptacle 36. This lower section 43 has a segment cut away. In other words, the portion of the plug outside a chord of the circle defined by the lower section 43 is cut away. This cut away is designated by numeral 56. In alignment with this segment 56 is a laterally disposed small aperture 58 through the lateral wall of the receptacle 36. These two structural elements define an air passageway between the chamber 34 in the fluid receptacle 36 and the variable volume chamber 28 defined by the inner and outer housings 12 and 14.

The cap 48 has a longitudinally tapered and extended neck 50 which receives the hollow needle 52 and maintains it in proper alignment so that the needle can be properly positioned within the chamber 34. Fitting 54 is placed on the tapered and extended neck 50, to assure that the hollow needle 42 remains in position during operation. The cap 48 also has a peripherally extending abutment 49, which overlaps the inner housing 14 and abuts with the open terminal end 51 of the outer housing 12 when the inner and outer housing are in an operable position.

The contiguous relationship of the conical shaped cap 48, with the upper section of the plug 42 is best shown in FIGURE 3, which is a cross-sectional cut away of the instrument taken along the line 3—3 of FIGURE 1. The inner surface of cap 48 contains a longitudinally protruding inner tip 60, which is triangular when viewed in cross-section and which is received by the plug 42 within a triangularly-shaped depression 62. As shown in FIGURE 3 the needle 52 projects through the cap 48 near one of the corners of the triangular tip 60 and the depression 62.

The operation of the embodiment shown in FIGURE 1 is now fully explained. When the attendant wishes to withdraw fluid from the subject patient, for clinical analysis, a fluid receiving receptacle 36, which preferably has been previously sterilized, is placed within the instrument assembly 10. The cutaway 56 and the aperture 58 are initially aligned to define a passageway from chamber 34 to the outside environment. The hollow needle 52, which may be disposable, is inserted through the fitting 54 and the neck 50 and is pushed through the plug 42. However, the needle 52 does not initially pierce the bottom surface of the plug 42, that is the needle 52 will not yet extend into the fluid chamber 34. The attendant then places a finger into the recess 32, covering hole 30, and pulls the outer housing 12, while holding the inner housing 14. This expands chamber 28, drawing air from the chamber 34 in the fluid receptacle 36. The chamber 34 is then closed by twisting the cap 48 slightly with one hand while holding the receptacle with the other hand. The outer housing 12 or the inner housing 14 should be a little flexible to facilitate this operation. This rotational movement turns the opening 58 away from the segment 56 to maintain vacuum within the chamber 34 and closes the receptacle. Thus, the vacuum within the receptacle 36 can be maintained until the instrument assembly 10 is to be used. When the patient is ready, the leading end of the needle 52 is inserted into the tissue of the patient in the conventional manner and by the force so exerted the trailing end of the needle 52 punctures the lower end of the plug 42, thereby establishing a conduit from the body tissue of the patient to the evacuated fluid receiving chamber 34. The lower pressure within chamber 34 now draws out the fluid from the body. When sufficient fluid has been so withdrawn, the needle is removed from the patient's tissue. The fluid receptacle 36 then can be removed from the instrument chamber 28 by first taking off the outer housing 12 and then separating the receptacle and its plug from inner housing 14. The needle 52 can be disposable and a new one can be inserted within the fitting 54. Then another sterilized receptacle 36 can be inserted with a new plug 42 to make the instrument ready to be used for another withdrawal operation.

It will be appreciated that it also is possible to use the instrument without evacuating it first. In this case, the needle is inserted through the plug 42 and into the patient. Then the operator creates a vacuum by closing the hole 30 and pulling the housing 12, without closing the aperture 58. In essence, this mode of operation is analogous to the use of a hypodermic syringe.

FIGURES 4, 5 and 6 disclose another embodiment of the invention in which the vacuum within the fluid receiving receptacle is not established before the needle is inserted in the patient. In this embodiment there are inner and outer housings 112 and 114, which are longitudinally and slidably received, one within the other. The interaction of these housings defines a variable volume chamber 122. The inner housing 112 has a peripheral shoulder 116 in its outer wall near one end thereof which is an abutment limiting the sliding of the outer housing 114.

The outer housing is a tube, closed at one end. There is a bead 120 around the closed end, analogous to the bead 26 described above, and there are a finger recess and hole 126 near that end, analogous to the hole 30. The inner housing 112 is closed at one end, the closed end being analogous to the cap 48.

The variable volume chamber 122 defined by the inner and outer housings 112 and 114 receives a fixed volume fluid receptacle 124 which is a tube having a closed end and an open end. The open end receives a plug 134 which may be of rubber or some other resilient material, preferably capable of sterilization. An evacuation tube 128 extends through the plug, being flush with the outer face of the plug, and inwardly to near the bottom of the receptacle 124.

The plug 134 is best seen in the amplified sectional view of FIGURE 5. The tube 128 extends through an opening 136 which firmly receives it.

A hollow needle 140 also extends through the plug 134 and into the receptacle. The plug means 134 has an inner truncated cone-shaped recess 138 at its lower end through which the needle extends. The outer portion of plug 134 also may have a circular truncated cone shaped recess 142 which extends inwardly towards the midpoint of the plug. These two recesses 138 and 142 reduce the thickness of the plug through which the needle extends, defining a diaphragm 144 at about the middle of the plug. This diaphragm 144 is relatively easily pierced by the hollow bored needle 140.

As best seen in FIGURES 5 and 6, plug means 134 has a laterally-extending rib 146. This rib extends about three-fourths of the way around the plug and outwardly against the inner wall of the housing 112. This construction maintains the receptacle in alignment with the hollow needle 140. Since the rib 146 does not extend all the way around the inner housing, there is a space between one side of the plug and the housing, defining a passageway 151, to allow the evacuation of the inner chamber 127 of fluid receptacle 124 to the outer environment through the variable volume changer 122.

The instrument as shown in the second embodiment is operative without the necessity of establishing a vacuum within the chamber 127 within receptacle 124 prior to its operational use. A vacuum is established within the chamber 127 as the fluid is withdrawn from the individual patient. The hollow needle 140 is inserted into the tissue of the patient, establishing a conduit between the tissue and the chamber 127, and the outer housing 114 is longitudinally moved with respect to the inner housing 112. Through this movement air within the chamber 127 is withdrawn through evacuation tube 128, passageway 151 and into the expanded chamber 122. As can readily be understood, this will allow the fluid to flow directly into the receptacle 124 until the necessary amount has been received therein at which time the hollow needle 140 is withdrawn from the patient.

The inner and outer housing can then be disassembled and the fluid receiving receptacle 124 removed with its plug. The needle 140 also will be removed from the plug means 134. The needle 140 and plug means 134 can be sterilized and reused or discarded and replaced.

The invention provides an advance in the art with new structural elements which mitigate the problems previously encountered in this field. It will thus be seen that there has been provided by this invention a structure in which the various objects hereinbefore set forth, together with many practical advantages, are successfully achieved. It will be appreciated that changes may be made in details of construction and mode of operation of the mechanical features of the above-described embodiments, all without departing from the scope of the invention, as set forth in the appended claims.

What is claimed is:

1. An instrument for drawing fluid from the human body, comprising;
   an inner housing and an outer housing means, said outer housing slidably and longitudinally receiving said inner housing and outer housing defining a variable volume chamber receiving a fluid receptacle, said outer housing having an orifice communicating with the variable volume chamber so that by closing said orifice when longitudinal movement is imparted to said outer housing relative to said inner housing a vacuum is created within a receptacle placed within said inner housing,
   a fluid receptacle having an opening at one end receiving a plug means, thereby defining a fixed volume chamber within said variable volume chamber,
   plug means for said fluid receptacle mounted in said chamber, said plug means having a passageway providing communication between said receptacle and a portion of said variable volume chamber exterior of said receptacle,
   a hollow bored needle means for puncturing the surface of the body and mounted in said plug means to define a conduit for said body fluid to said receptacle when fluid is to be withdrawn from the body, whereby longitudinal movement of said outer housing relative to said inner housing creates a vacuum within said receptacle, allowing body fluid to flow in said hollow bored needle from the body to said receptacle.

2. An instrument as in claim 1 including a thumb recess located at the orifice area of said outer housing, whereby the longitudinal movement can be generated by the human hand and through the proper actuation of said inner and outer housings a vacuum can be created within said variable volume chamber.

3. An instrument as in claim 1, including a tube extending from said passageway in said plug into said receptacle,
   said tube projecting longitudinally towards the closed end of said receptacle.

4. An instrument as in claim 1 wherein said plug means consists of a stopper composed of resilient material.

5. An instrument as in claim 4 wherein said plug means has a diaphragm at the midsection thereof which can be readily pierced by said hollow bored needle means thereby effectively establishing a flow conduit to said receptacle.

6. An instrument as in claim 5 wherein said plug means has a shoulder extending peripherally along the rim of said receptacle means,
   said shoulder having a peripheral section thereof in abutment with said inner housing means, the opposite section of said shoulder having a relatively smaller shoulder which does not abut said inner housing means, said smaller non-abutting shoulder defining thereby a conduit with the inner housing wall which evacuates said receptacle.

7. An instrument as in claim 6 including a resilient ring between the outer and inner housing means allowing free relative movement of said means and assuring the proper evacuation of said receptacle, creating thereby the desired vacuum.

8. An instrument as in claim 1 wherein said inner housing means has an upper enclosing conical shaped capsule which is fitted to said inner housing and composed of equivalent material,
   said capsule having an overlap abutting with the peripheral open end of said outer housing, and
   said capsule further having fitting means on its outer surface capable of retaining and receiving said hollow bored needle means.

9. An instrument as in claim 8 wherein said conical shaped capsule has a triangular shaped extension projecting inwardly towards said plug means, and
   plug means having a triangular shaped indentation said extension, thereby assuring a vacuum retaining enclosure and also assuring the proper placement for said hollow bored needle means within the vacuum chamber when said needle pierces said plug means.

10. An instrument as in claim 1 wherein said inner housing means is of unitary construction having one end thereof terminated in a conical shaped fitting means for receiving and retaining said hollow bored needle,
    said inner housing having a shoulder extending circumferentially about its lateral surface, whereby the open peripheral edge of said outer housing can be received in abutment thereon.

11. An instrument as in claim 1 including:
    a fluid receptacle having a fixed volume chamber and a small opening on the lateral wall thereof in proximity with the open end of said receptacle,
    said small opening being in alignment with said plug passageway and defining thereby a conduit between said fixed volume and said variable volume chambers.

12. An instrument as in claim 11 wherein said plug means consists of a rubber molded stopper, having cylindrical configuration and adapted to be snugly but movably received at said open end of said fluid receptacle.

13. An instrument as in claim 12 wherein the outer peripheral surface of said stopper has a shoulder indentation midpoint along its length overlapping the opening of said fluid receptacle, so that a secure fit, to maintain a vacuum within said fluid receptacle, can be assured for the fixed volume chamber.

14. An instrument as in claim 13 wherein said stopper has an arcuate instep cut away to define said passageway between itself and said receptacle when said plug is inserted in said open end of said receptacle.

15. An instrument as in claim 14 wherein said plug means is rotatable relative to said fluid receptacle means, which when rotated closes said conduit between said fixed volume and said variable volume chambers, thereby making said fluid receptacle means capable of maintaining a vacuum therein.

References Cited

UNITED STATES PATENTS

| | | | |
|---|---|---|---|
| 2,460,641 | 2/1949 | Kleiner | 128—276 |
| 2,617,359 | 11/1952 | Van Horn et al. | 128—215 |
| 2,639,709 | 5/1953 | Volgenau | 128—276 |
| 2,700,973 | 2/1955 | Ju | 128—276 |

RICHARD A. GAUDET, *Primary Examiner.*

M. F. MAJESTIC, *Assistant Examiner.*

U.S. Cl. X.R.

128—276